United States Patent
Nijdam (10) Patent No.: US 7,114,153 B2
(45) Date of Patent: Sep. 26, 2006

(54) METHOD AND APPARATUS FOR CONTINUATION-PASSING IN A VIRTUAL MACHINE

(75) Inventor: Marc E. Nijdam, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 386 days.

(21) Appl. No.: 10/659,829

(22) Filed: Sep. 10, 2003

(65) Prior Publication Data

US 2005/0055663 A1   Mar. 10, 2005

(51) Int. Cl.
*G06F 9/455* (2006.01)
*G06F 12/00* (2006.01)
*G06F 9/34* (2006.01)

(52) U.S. Cl. .................. 718/1; 711/6; 711/203
(58) Field of Classification Search .............. 718/1; 711/6, 203
See application file for complete search history.

(56) References Cited

U.S. PATENT DOCUMENTS

| | | | | |
|---|---|---|---|---|
| 5,928,321 A | * | 7/1999 | Ozcelik et al. | 718/1 |
| 6,026,485 A | * | 2/2000 | O'Connor et al. | 712/226 |
| 6,092,152 A | * | 7/2000 | Tremblay et al. | 711/132 |
| 2003/0033344 A1 | * | 2/2003 | Abbott et al. | 709/1 |
| 2003/0191792 A1 | * | 10/2003 | Waki et al. | 709/100 |

\* cited by examiner

*Primary Examiner*—Lewis A. Bullock, Jr.
(74) *Attorney, Agent, or Firm*—Philip R. Wadsworth; Robert J. O'Connell; Christopher S. Chow (57) ABSTRACT

Methods and apparatus for continuation passing in a virtual machine (VM). A method is provided for operating a virtual machine to provide continuation passing in a wireless device. The virtual machine comprises a stack memory. The method comprises encountering a context-creating trigger, constructing a continuation block in response to the trigger that comprises a stack fragment derived from the stack memory, encountering an evaluation instruction, and storing the stack fragment from the continuation block on the stack memory in response to the evaluation instruction.

12 Claims, 6 Drawing Sheets

METHOD AND APPARATUS FOR CONTINUATION-PASSING IN A VIRTUAL MACHINE

BACKGROUND

I. Field

The present invention relates generally to computing systems, and more particularly, to methods and apparatus for providing continuation passing in a virtual machine to provide efficient program flow and memory resource utilization.

II. Description of the Related Art

Advances in technology have resulted in smaller and more powerful wireless devices. For example, there currently exist a variety of portable wireless telephones, personal digital assistants (PDAs), and paging devices that are small, lightweight, and can be easily carried by users. Typically, these devices include an embedded controller with limited memory resources. For example, the amount of available memory may be limited by the small size of the device.

As wireless devices have become more widespread, there is an increasing need for these devices to handle larger amounts of data and to execute programs that are more sophisticated. For example, users are demanding remote access to interactive programs, such as gaming programs, that require wireless devices to provide fast and efficient communication with remote service providers using a wireless network. In addition, users would like to have remote access to specific programs that are typically accessible on larger home or office systems.

In order to meet these demands, device and service providers have the choice of developing their own technology or trying to make use of existing technology. Unfortunately, developing new technology is both time consuming and expensive, and therefore, an unattractive alternative. To use existing technology, such as existing software, compatibility problems must be overcome. For example, software developed for one processing system may not be compatible with another processing system. Thus, compatibility problems need to be addressed when porting software from one or more systems to run on a wireless device.

One technique used to overcome compatibility problems involves the use of a virtual machine (VM). A typical VM comprises software executing on a host system that allows the host system to run non-native program instructions written for some other system (i.e., a remote system). For example, the non-native program instructions written to execute on the remote system are interpreted by the VM software running on the host system. Thus, a VM running on a wireless device allows the device to run software written for various different systems, thereby allowing device developers and service providers to use existing software to provide added functionality to wireless device users.

Unfortunately, implementing a VM on a resource limited wireless device raises other problems. For example, most VM implementations employ a stack for temporary storage that may be used as a scratch pad to store constants, variables, arguments to called procedures, or other information needed for program execution. During bytecode execution, it is possible to encounter a dynamic function that creates an activation record or context, which may include stack pointers, current program counter (PC), code pointers, etc. A closure or block is a bytecode fragment that refers to elements on the stack in the current context (from where the block was created.) Blocks can be returned from contexts to be used elsewhere in application code. An example is a sort block passed to a sorting function. In order to execute the block at a later stage, the creating context cannot be released, i.e., the creating function cannot return. The block can only be passed to function calls made from the creating function. However, being able to return a parameterized block (i.e., a block that refers to data in the creating context) would be extremely useful.

Some systems solve this problem by creating a completely new stack for each activation record. Since the maximum stack size for each activation record can be computed at compile-time, the stack size is bounded. While this technique seems to solve the problem, it penalizes every function call with stack creation and parameter copying, which is costly on systems with low processing power and limited memory, such as a wireless device. Others techniques allow the return of the creating activation record only if the block does not refer to any actual data in the creating activation record (i.e. the block is clean). This technique solves part of the problem, but does not allow the block to be parameterized with data that was available in the creating context.

Therefore, what is needed is a VM for use in a resource-limited wireless device to provide continuation passing to allow a return of a parameterized block that refers to data in the creating context, thereby providing fast program execution while efficiently utilizing the available memory resources.

SUMMARY

In one or more embodiments, methods and apparatus are provided to allow a VM to perform continuation passing in a resource limited wireless device. For example, the wireless device may be a wireless telephone having an embedded processor and limited memory resources that execute program instructions to provide one embodiment of a VM. The VM allows the wireless device to execute non-native program instructions written for a different system. As a result, the wireless device is able to provide the device user with the functionality of the non-native program.

In one embodiment, the VM performs continuation passing so that a block is created in response to encountering a context-creating trigger, such as a dynamic function call. The VM behaves an extended context that includes a copy of the current stack fragment of the current context. In addition, a parameter offset into the fragment of the parameters included in the block is stored. Upon block evaluation, the elements of the stored stack fragment are pushed back onto the stack, effectively reconstructing the context of the block from which the block was created. The parameters passed to the block are stored in the fragment using a stored parameter index. The block can then execute with the full state of the creating context.

By pushing the stack fragment back onto the stack, the creating context of the block is effectively re-instated. This enables parameterized blocks to be returned by a context. By copying the stack fragment only when a block is created, processing and memory overhead are minimized.

In one embodiment, a method is provided for operating a virtual machine to provide continuation passing in a wireless device. The virtual machine comprises a stack memory. The method comprises encountering a context-creating trigger, constructing a continuation block in response to the trigger that comprises a stack fragment derived from the stack memory, encountering an evaluation instruction, and storing the stack fragment from the continuation block on the stack memory in response to the evaluation instruction.

In another embodiment, a virtual machine is provided for use in a wireless device having an embedded processor. The virtual machine comprises a stack memory that comprises logic to store and retrieve information. The virtual machine also comprises logic to encounter a context-creating trigger and logic to construct a continuation block in response to the trigger, wherein the continuation block comprises a stack fragment derived from the stack memory. The virtual machine also comprises logic to encounter an evaluation instruction and logic to store the stack fragment from the continuation block on the stack memory in response to the evaluation instruction.

In another embodiment, a virtual machine is provided for use in a wireless device having an embedded processor. The virtual machine comprises means for providing a stack memory and means for encountering a context-creating trigger. The virtual machine also comprises means for constructing a continuation block in response to the trigger, wherein the continuation block comprises a stack fragment derived from the stack memory. The virtual machines also comprises means for encountering an evaluation instruction and means for storing the stack fragment from the continuation block on the stack memory in response to the evaluation instruction.

In another embodiment, a computer readable media is provided that comprises program instructions that when executed by processing logic provides a virtual machine that performs continuation passing. The virtual machine comprises a stack memory, and the computer readable media comprises program instructions for encountering a context-creating trigger. The computer readable media also comprises program instructions for constructing a continuation block in response to the trigger, wherein the continuation block comprises a stack fragment derived from the stack memory. The computer readable media also comprises program instructions for encountering an evaluation instruction and program instructions for storing the stack fragment from the continuation block on the stack memory in response to the evaluation instruction.

In another embodiment, a wireless device is having an embedded processor is provided. The wireless device comprises a stack memory that comprises logic to store and retrieve information. The wireless device also comprises a virtual machine that operates to perform continuation passing. The virtual machine comprises logic to encounter a context-creating trigger and logic to construct a continuation block in response to the trigger, wherein the continuation block comprises a stack fragment derived from the stack memory. The virtual machines also comprises logic to encounter an evaluation instruction and logic to store the stack fragment from the continuation block on the stack memory in response to the evaluation instruction.

Other aspects, advantages, and features of the present invention will become apparent after review of the hereinafter set forth Brief Description of the Drawings, Detailed Description of the Invention, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes one or more embodiments of methods and apparatus for providing a VM that performs continuation passing in a wireless device. In one or more embodiments, the wireless device has limited resources (i.e., limited memory capacity), and continuation passing provided by the VM is achieved by performing the following steps.

1. Encountering a context-creating trigger (i.e., a continuation creating instruction such as a push continuation instruction).
2. Constructing a continuation block that includes a stack fragment plus other information included in an activation record (i.e., code pointer, etc.).
3. Pushing the continuation block onto a stack memory.
4. Encountering a continuation evaluation instruction.
5. Retrieving the continuation block.
6. Pushing the stack fragment back onto the stack.
7. Evaluating the continuation by jumping to program code associated with a code pointer stored in the continuation block.

Figure 1:
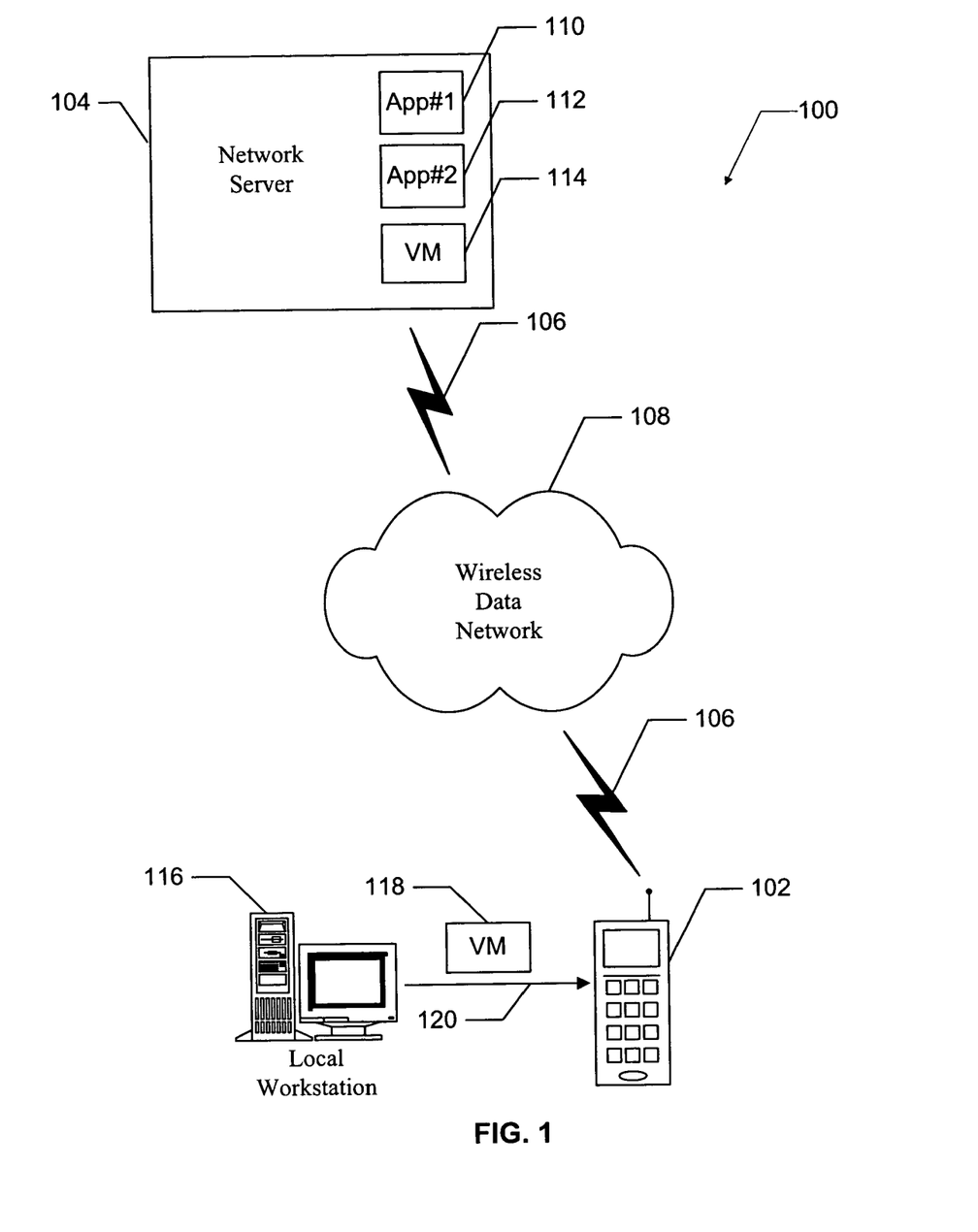
FIG. 1 illustrates a data network that includes a wireless device with limited memory resources suitable for implementing one embodiment of a VM to perform continuation passing.

FIG. 1 illustrates a data network 100 that includes a wireless device 102 with limited memory resources suitable for implementing one embodiment of a VM that performs continuation passing. In the system 100, the wireless device 102 communicates with a network server 104 over a wireless network 108 using wireless communication channels 106. In one embodiment, the device 102 comprises a wireless telephone that may transmit and/or receive data and/or voice information over the wireless network 108. However, the device 102 may comprise any other type of wireless device. The device 102 operates to request various information from the server 104 that include applications 110, 112 and/or system services. For example, the system services include a VM 114 that provides one embodiment of continuation passing.

In one embodiment, the device 102 also couples directly to a local system, such as a local workstation 116, via a direct link 120. This direct link 120 allows the device 102 to exchange data and/or programs with the local workstation 116. In one embodiment, the local workstation 116 downloads a VM 118 to the device 102 using the direct link 120. The VM 118 may be the same as the VM 114, and both operate to provide one or more embodiments of continuation passing.

In one embodiment, the device 102 comprises an embedded system that includes an embedded processor, memory and various interfaces, so that the device 102 may store, load and execute the applications 110 and/or the VM 114 downloaded from the server 104. The applications 110 and VM 114 may interact with a runtime environment executing on the device 102 used to simplify operation of the device, such as by providing generalized calls for device specific resources. One such runtime environment is the Binary Runtime Environment for Wireless™ (BREW™) software platform developed by QUALCOMM, Inc., of San Diego, Calif.

The VM 114 may be download from the server 104 to the device 102 in order to facilitate the device's 102 execution of software developed for different computing systems. For example, application 112 may include non-native program instructions written for a target device or system that is different from the device 102. The VM 114 operates to simulate the environment of the target system so that target applications (like application 112) that are designed to execute on the target system may also execute on the device 102. For example, in one embodiment, the VM 114 operates to provide a JAVA system environment so that JAVA applications may be downloaded and executed on the device 102. In one or more embodiments, the VM 114 includes methods and apparatus for providing continuation passing during the execution of these non-native instructions.

The VM 118 that is downloaded to the device 102 from the local workstation 116 maybe identical to the VM 114, and therefore, also operates to provide one or more embodiments of continuation passing. In one embodiment, the VM 118 is provided on a computer readable media, such as a floppy disk, and is loaded onto the system 116 for transmission to the device 102. In another embodiment, the VM may be stored on a computer readable memory device, such as a memory card (not shown), and plugged directly into the device 102, so that the VM may execute on the device 102. Thus, the device 102 may receive the VM in a wireless transmission, a wired transmission, or by retrieving it directly from a memory device.

Because the device 102 is portable and has limited memory resources, it is especially well suited to run a VM with one or more embodiments of continuation passing. For example, because the device 102 has limited memory capacity, a VM with continuation passing operates to efficiently utilize the available memory and provide fast and efficient program interpretation and execution of non-native program instructions.

Figure 2:
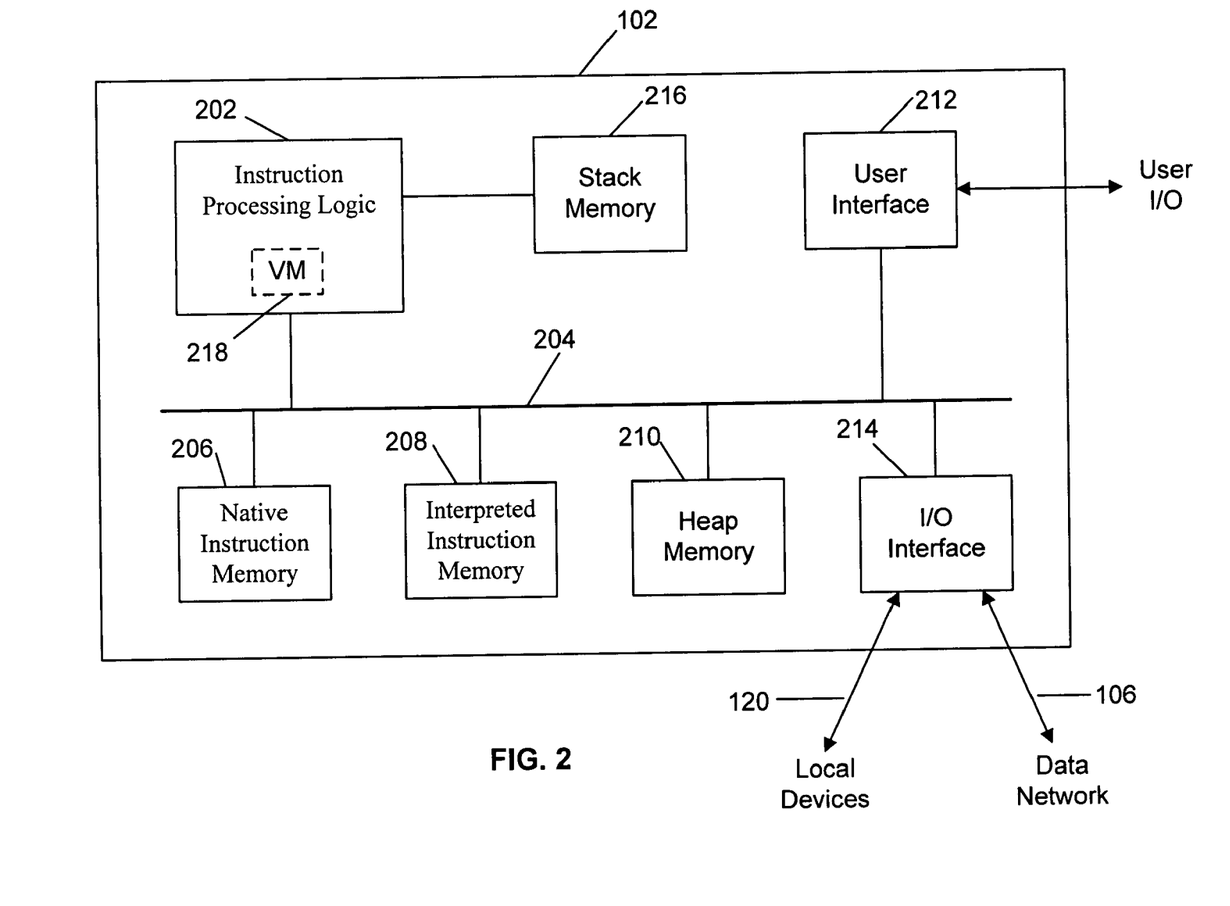
FIG. 2 shows a functional block diagram illustrating one embodiment of the wireless device of FIG. 1.

FIG. 2 shows a functional block diagram illustrating one embodiment of the device 102 that includes a VM that operates to perform continuation passing. The device 102 comprises instruction processing logic 202 that is coupled to an internal data bus 204. Also coupled to the internal data bus 204 are native instruction memory 206, interpreted instruction memory 208, heap memory 210, user interface 212 and input/output (I/O) interface 214.

During operation of the device 102, the processing logic 202 executes program instructions stored in the native instruction memory 206. In one or more embodiments, the processing logic 202 comprises a CPU, gate array, hardware logic, software or any combination of hardware and software. Thus, the processing logic 202 generally comprises logic to execute machine-readable instructions stored in the native instruction memory 206.

The native instruction memory 206 comprises RAM, ROM, FLASH, EEROM, or any other suitable type of memory, or any combination thereof. In one embodiment, the native instruction memory 206 is located internal to the device 102, and in another embodiment, the native instruction memory 206 comprises a portable memory card or memory device that may be selectively attached to the device 102, and thereby couple to the internal bus 204. Thus, the native instruction memory 206 may comprise virtually any type of memory that is capable of storing instructions that may be executed by the processing logic 202.

The user interface 212 receives user input, for example, from a keypad, pointing device, touch pad, or other input mechanisms, such as audio circuitry to receive and process voice commands. The user interface 212 may also provide outputs to various output mechanisms, such as a display, LEDs, audio speaker or other types of visual or audible indicators. Thus, the user interface 212 comprises hardware and/or software in any combination to allow the device 102 to receive user input and output visual information or audible indicators to the user.

The I/O interface 214 operates to transmit and receive information between the device 102 and external devices, systems, and/or networks. For example, in one embodiment, the I/O interface 214 comprises a radio transceiver circuit (not shown) that operates to transmit and receive information over a wireless data network using, for example, communication link 106. For example, the transceiver comprises circuitry that modulates information received from the processing logic 202 and converts the modulated information into high frequency signals suitable for wireless transmission. Similarly, the transceiver also comprises circuitry to convert received high frequency communication signals into signals suitable for demodulation and subsequent processing by the processing logic 202.

In another embodiment, the I/O interface 214 comprises a transceiver that operates to transmit and receive information over a hardwired communication link, such as a telephone line, to communicate with a remote system on a public data network, such as the Internet.

In still another embodiment, the I/O interface 214 comprises circuitry that operates to communicate with local devices, such as the local workstation 116 using the link 120. The I/O interface 214 may also include circuitry to communicate with a printer or other local computer or device, such as floppy disk or memory card. Thus, the I/O interface 214 may comprise any type of hardware, software, or combination thereof to allow the device 102 to communicate with other local or remotely located devices or systems.

During operation of the device 102, native program instructions stored in the native instruction memory 206 are executed by the processing logic 202. In one embodiment, execution of the native program instructions by the processing logic 202 causes a VM 218 to be generated. The VM 218 operates to interpret non-native program instructions that are stored in the interpreted instruction memory 208. For example, applications having non-native program instructions, like application 112, may be downloaded to the device 102 via the wireless network and stored in the interpreted instruction memory 208.

To assist with instruction execution, the VM 218 utilizes a stack memory 216 to store program data or instructions on a temporary basis. For example, the VM 218 may store constants, variables, program addresses, pointers, instructions or other information items on the stack memory 216. In another embodiment, the VM 218 may store information on a temporary basis in the heap memory 210. The heap memory comprises virtually any type of memory suitable for the storage and retrieval of information by the processing logic 202. The stack memory 216 may be dedicated for use by the VM 218, or may also be shared with the processing logic 202 during instruction execution.

In one embodiment, the processing logic 202 retrieves native instructions from the native instruction memory 206 via the internal bus 204. Execution of the native program instructions causes the VM 218 to be generated. The VM 218 then retrieves and executes the non-native instructions stored in the interpreted instruction memory 208 via the internal bus 204. Thus, the device 102 operates to generate the VM 218, which allows the device 102 to run non-native program code to provide selected functionality to the user. For example, the device user may wish to download and run a JAVA application that is incompatible with either the hardware or software configuration of the device 102. The VM 218 operates to provide a JAVA system environment, thereby allowing JAVA applications to run on the device 102. Furthermore, the VM 218 operates to provide one or more embodiments of continuation passing to provide fast interpretation and execution of the non-native instructions and efficient utilization of the limited memory resources of the device 102.

In one embodiment, native program instructions to generate the VM 218 are downloaded into the native instruction memory 206 of the device 102 from a remote server via the I/O interface 214. For example, referring to FIG. 1, the remote server 104 downloads the native program instructions to the device 102 via the wireless network 108. In another embodiment, the local workstation 116 downloads the native program instructions to the device 102 via the link 120. In a similar manner, non-native program instructions may also be downloaded to the device 102.

It should be noted that the configuration of the device 102 is just one configuration suitable for generating a VM that provides continuation passing. It is also possible to generate a VM using other device configurations within the scope of the present invention. Furthermore, although the described VM is shown implemented in the wireless device 102, it is also possible to implement the VM in virtually any type of device having an embedded processor and limited memory resources.

Figure 3:
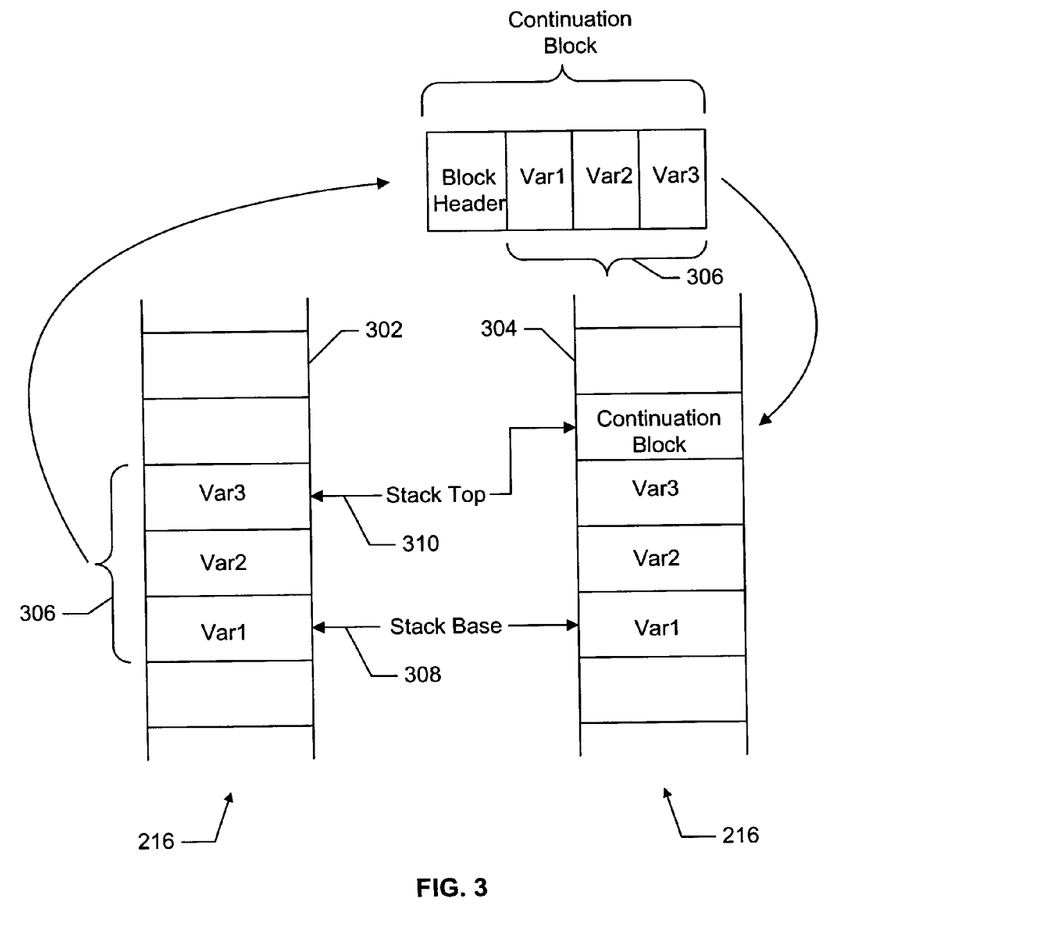
FIG. 3 shows an illustration of memory resources used to create a continuation block to provide continuation passing.

FIG. 3 shows a detailed illustration of the memory resources in the wireless device 102 that are used by the VM 218 to create a continuation block to provide continuation passing. The memory resources comprise the stack memory 216, which is shown at 302 before the continuation block is created, and at 304, after the continuation block is created. In one embodiment, the continuation block may be created and/or stored in the heap memory 210. A stack fragment 306 is defined that contains information relevant to a current continuation-creating context.

Figure 4:
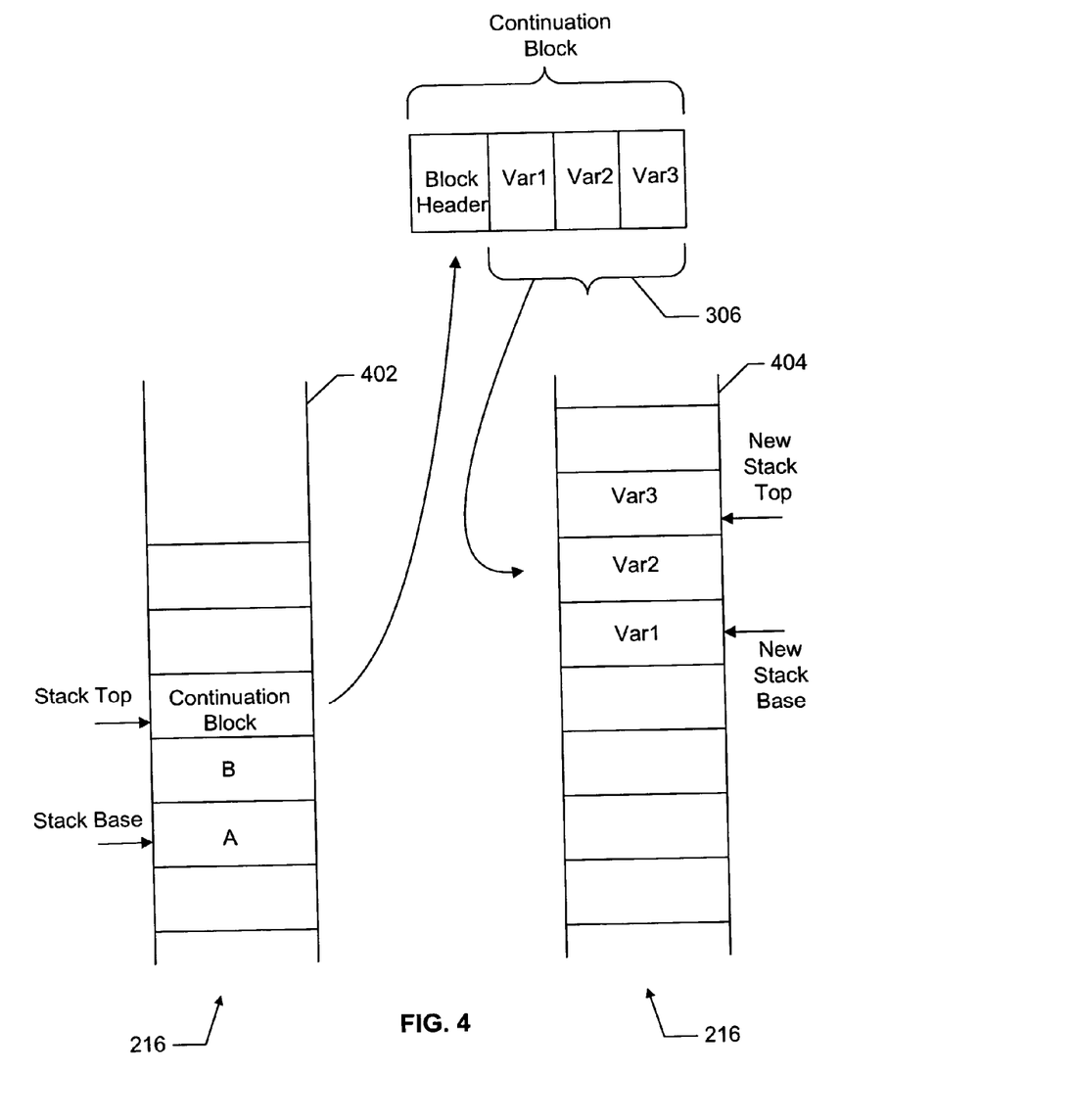
FIG. 4 shows an illustration of memory resources used to evaluate the continuation block of FIG. 3.

FIG. 4 shows a detailed illustration of the memory resources in the wireless device 102 that are used by the VM 218 to evaluate the continuation block shown in FIG. 3. The stack memory 216 is shown at 402 before the continuation block is evaluated, and at 404, after the continuation block is evaluated.

Figure 5:
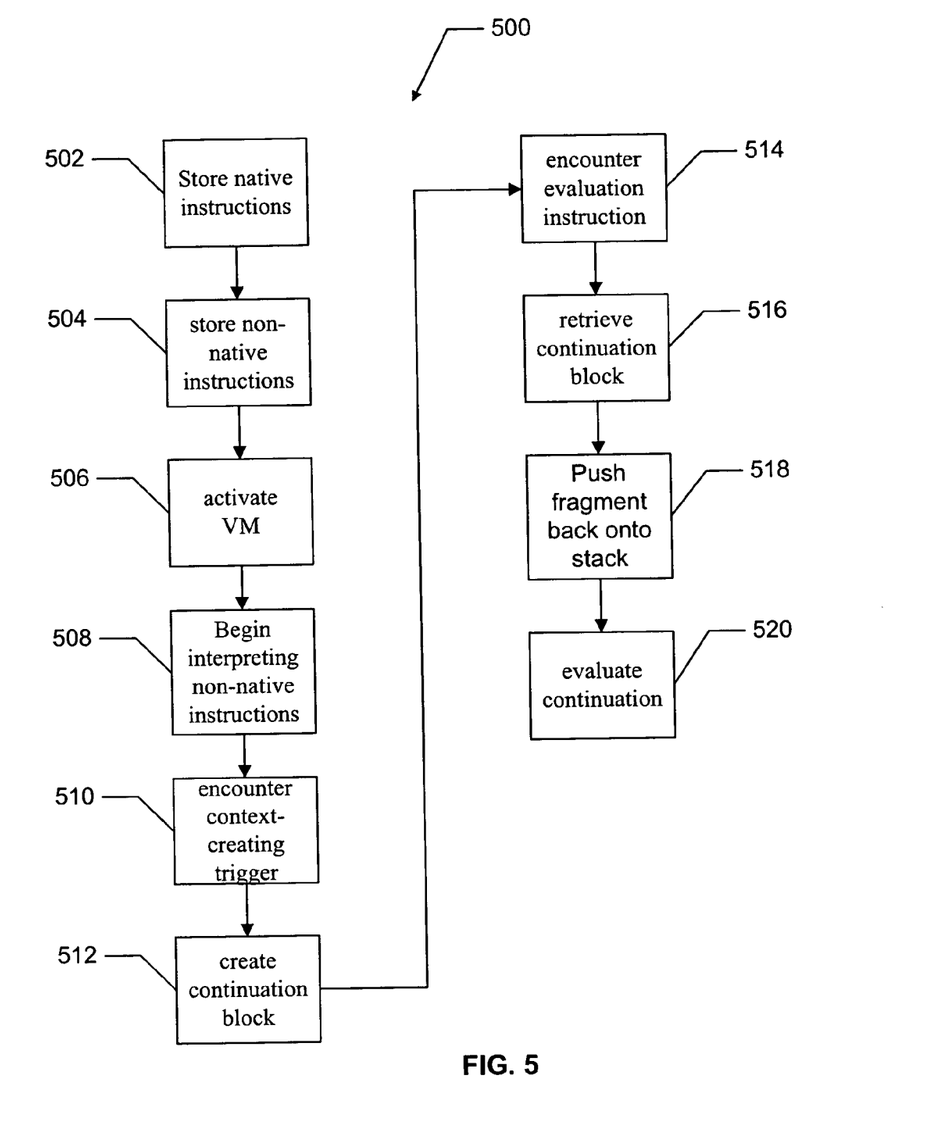
FIG. 5 shows one embodiment of a method for providing continuation passing in a VM for use in a wireless device.

FIG. 5 shows one embodiment of a method 500 for operating a VM to provide continuation passing for use in a resource-limited device, such as the wireless device 102. For the purpose of clarity, the description of the method 500 will reference the memory resources shown in FIGS. 3 and 4, and the architectures shown in FIGS. 1 and 2. Furthermore, it will be assumed that native program instructions for generating a VM that provides continuation passing are stored in the native program memory 206. It will further be assumed that an application, for instance application 112, comprising non-native program instructions is stored in the interpreted program memory 208. The non-native program instructions were created for use with another system and are not directly compatible with the device 102. However, the non-native program instructions provide functionality that is desirable to the user of the device 102. Thus, it is of benefit to the user of the device 102 to generate a VM to interpret and execute the non-native program instructions to achieve the desired functionality. Furthermore, the VM operates to provide one or more embodiments of continuation passing to efficiently utilize the limited memory resources of the device 102.

At block 502, native program instructions for generating a VM are stored into the native memory. For example, the VM may be downloaded into the device 102 from the wireless network 108 via the channel 106 and interface 214. In another embodiment, the VM may be downloaded into the device 102 from the local workstation 116 via the link 120 and the interface 214. In another embodiment, the native instruction memory may comprise a memory device that is plugged into the device 102, such as a memory card, and the VM is stored on that memory device. In still another embodiment, the VM is stored into the memory 206 during manufacture of the device 102.

At block 504, non-native program instructions that represent an application designed to run on a different system are stored into the interpreted instruction memory. For example, the non-native instructions may be downloaded from the network server 104 into the interpreted instructions memory 208 of the device 102 via the wireless network 108. In another embodiment, the non-native instructions are downloaded from the local workstation 116, or included on a memory device that is plugged into the device 102.

At block 506, the VM is activated. For example, the processing logic 202 retrieves the native instructions from the native instruction memory 206 via the internal bus 204 and begins to execute those instructions. By executing the native instructions, the processing logic operates to generate the VM 218.

At block 508, the VM begins interpreting the non-native instructions in the interpreted instruction memory. For example, the VM 218 retrieves non-native instructions from the memory 208 via the internal bus 204. The VM interprets and executes these instructions. In one embodiment, the VM uses the stack memory 216 or the heap memory 210 as temporary storage areas. In another embodiment, the stack memory 216 is a stack memory dedicated to the VM that may be different from any stack memory used by the processing logic 202.

At block 510, the VM encounters a context-creating trigger during the interpretation of the non-native instructions. For example, the context-creating trigger may occur when the VM encounters one or more selected non-native instructions to interpret. In another embodiment, the trigger may occur when the VM encounters a program marker that is associated with the non-native instructions. When the trigger is encountered, the stack 216 appears as that shown at 302.

At block 512, in response to the context-creating trigger, the VM operates to create a continuation block, as shown in FIG. 3. The continuation block includes the stack fragment 306 and a block header that includes information included in an activation record (i.e., code pointer, etc.). The stack fragment 306 represents a copy of a portion of the stack 216. For example, the information within the stack fragment 306 is a portion of the stack 216 that extends from the current stack base 308 to the current stack top 310. The stack fragment 306 is then copied into the continuation block. In one embodiment, the continuation block is then stored on the stack 216, as shown at 304. Thus, the first portion of the method 500 operates to generate the continuation block that includes the stack fragment 306 in response to encountering the context-creating trigger.

The remaining portion of the method 500 describes how the VM operates to evaluate the continuation.

At block 514, the VM encounters a continuation evaluation instruction, which may occur sometime after the continuation block is created. At block 516, the VM retrieves the continuation block, for example, from the stack 216, as shown in FIG. 4.

At block 518, the stack fragment 306 stored within the continuation block is pushed back onto the stack. For example, referring to FIG. 4, the stack fragment 306 is pushed onto the stack 216, as shown by the stack illustration at 404. In performing this step, a new stack top and a new stack base are determined.

At block 520, the continuation is evaluated by jumping to program code associated with a code pointer stored in the continuation block. For example, the block header associated with the continuation block contains a code pointer that is jumped to when the continuation is to be evaluated. Thus, the method 500 provides for continuation passing in a VM implemented in a memory limited wireless device. It should be noted that it is also possible to extend the above-described process to provide nested continuation passing within the scope of the present invention.

The method 500 is intended to be illustrative and not limiting of the operation of the various embodiments continuation passing described herein. For example, it would be obvious to one with skill in the art to make minor changes, additions or deletions to any of the described method steps. Furthermore, the described method steps may be combined, rearranged or reordered without deviating from the scope of the described embodiments.

Figure 6:
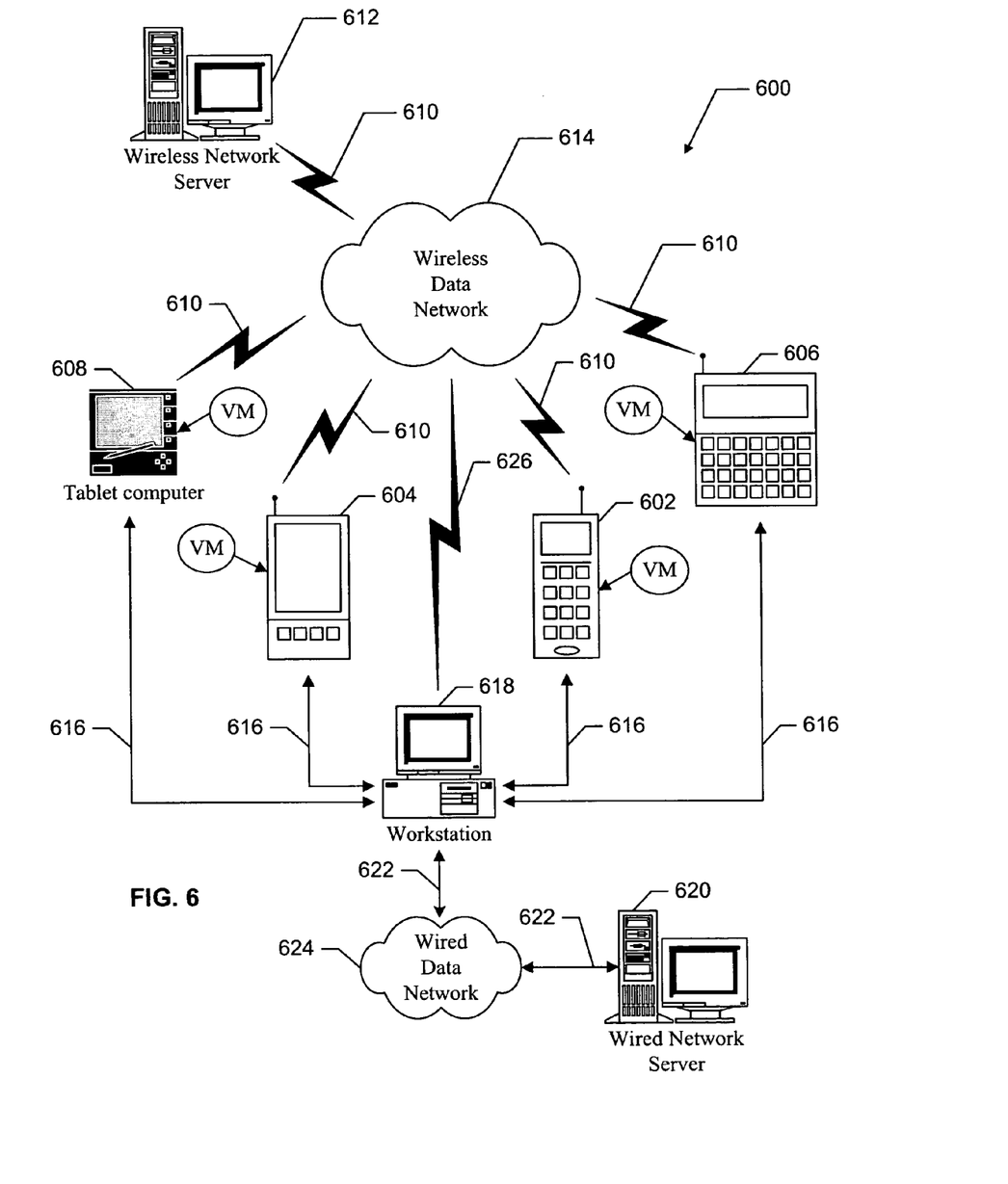
FIG. 6 illustrates a data network that includes portable computing devices with limited resources that are suitable to implement one or more embodiments of a VM to perform continuation passing.

FIG. 6 illustrates a data network 600 that includes wireless devices with limited memory resources that are suitable to implement one or more embodiments of VM to perform continuation passing. The wireless devices comprise a wireless telephone 602, personal digital assistant (PDA) 604, pager/email device 606 and a tablet computer 608. Because of their small size and light weight, the devices utilize embedded processors and have limited memory resources.

The devices (602, 604, 606, and 608) include circuitry to communicate over a wireless data network 614 with a wireless network server 612 using wireless communication channels 610. The wireless communication channels 610 may comprise, for example, satellite communication channels, terrestrial communication channels, or any other type of radio frequency (RF) or electromagnetic communication channels. The wireless data network 614 may be any suitable network capable of operating with the selected communication channels 610.

Additionally, the wireless devices (602, 604, 606, and 608) include circuitry to communicate over wired communication channels 616 with a workstation 618. The workstation 618 includes logic to communicate with a network server 620 over wired communication channels 622 using a wired data network 624. Furthermore, the workstation 618 includes logic to communicate with the wireless network server 612 using a wireless communication channel 626 and the wireless network 614

During operation of the network 600, the wireless devices (602, 604, 606, and 608) include one or more embodiments of a VM constructed to perform continuation passing. For example, the VM may be incorporated into a wireless device when the respective device is manufactured. In another embodiment, the VM may be stored on a memory card (not shown) that plugs into a wireless device, thereby allowing the wireless device to retrieve instructions and operate the VM from the memory card. Thus, the program instructions that comprise the VM are stored on a computer readable media. Virtually any type of computer readable media may be used to store the program instructions that when executed by a wireless device generates one or more embodiments of a VM that performs continuation passing as described herein.

In one or more embodiments included in the present invention, methods and apparatus provide a VM that performs continuation passing for use in a resource-limited device. Accordingly, while one or more embodiments of the methods and apparatus have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

I claim:

1. A method for providing continuation passing in a virtual machine having a stack memory, comprising:
   encountering a context-creating trigger;
   responsive to said encountering of said context-creating trigger:
      constructing a continuation block, said continuation block comprising a block header and a stack fragment, said stack fragment comprising a range of said stack memory between a current stack top address and a current stack base address; and
      pushing said continuation block onto said stack memory;
   encountering an evaluation instruction; and
   responsive to said encountering of said evaluation instruction:
      popping said continuation block from said stack memory;
      pushing said stack fragment portion of said continuation block onto said stack memory;
      setting said current stack top address to a start of said stack fragment of said stack memory; and
      setting said current stack base to a end of said stack fragment of said stack memory.

2. The method of claim 1, wherein the context-creating trigger comprises a selected program instruction.

3. The method of claim 1, wherein the context-creating trigger comprises a program marker associated with a program instruction.

4. The method of claim 1, further comprising jumping to selected program code to evaluate the continuation.

5. A virtual machine for use in a wireless device having an embedded processor, the virtual machine comprising:
   a stack memory that comprises logic to push and pop information;
   a logic to encounter a context-creating trigger;
   a logic for responding to an encounter with said context-creating trigger by:
      constructing a continuation block, said continuation block comprising a block header and a stack fragment, said stack fragment comprising a range of said stack memory between a current stack top address and a current stack base address; and
      pushing said continuation block onto said stack memory;

a logic to encounter an evaluation instruction; and
a logic for responding to an encounter with said evaluation instruction by:
 popping said continuation block from said stack memory;
 pushing said stack fragment portion of said continuation block onto said stack memory;
 setting said current stack top to a start of said stack fragment; and
 setting said current stack base to an end of said stack fragment.

6. The virtual machine of claim 5, wherein the context-creating trigger comprises a context evaluation instruction.

7. The virtual machine of claim 5, wherein the context-creating trigger comprises a program marker associated with a program instruction.

8. The virtual machine of claim 5, further comprising logic to jump to selected program code to evaluate the continuation.

9. A computer readable media storing instructions that when executed by processing logic provides a virtual machine having a stack memory that performs continuation passing, said instructions comprising:
 instructions for encountering a context-creating trigger;
 instructions for responding to an encounter with said context-creating trigger by:
  constructing a continuation block, said continuation block comprising a block header and a stack fragment comprising a range of said stack memory between a current stack top address and a current stack base address; and
  pushing said continuation block onto said stack memory;
 instructions for encountering an evaluation instruction; and
 instructions for responding to an encounter with said evaluation instruction by:
  popping said continuation block from said stack memory;
  pushing said stack fragment portion of said continuation block onto said stack memory;
  setting said current stack top to a start of said stack fragment; and
 setting said current stack base to an end of said stack fragment.

10. A virtual machine comprising:
 a stack memory means;
 a means for encountering a context-creating trigger;
 a means for responding to an encounter with said context-creating trigger by:
  constructing a continuation block, said continuation block comprising a block header and a stack fragment, said stack fragment comprising a range of said stack memory means between a current stack top address and a current stack base address; and
  pushing said continuation block onto said stack memory;
 a means for encountering an evaluation instruction; and
 a means for responding to an encounter with said evaluation instruction, comprising:
  a means for popping said continuation block from said stack memory;
  a means for pushing said stack fragment portion of said continuation block onto said stack memory;
  a means for setting said current stack top to a start of said stack fragment; and
 a means for setting said current stack base to an end of said stack fragment.

11. The virtual machine of claim 10, further comprising means for jumping to selected program code to evaluate the continuation.

12. A wireless device having an embedded processor, the wireless device comprising:
 a stack memory that comprises logic to push and pop information; and
 a virtual machine that operates to perform continuation passing, the virtual machine comprising:
  a logic to encounter a context-creating trigger;
  a logic for responding to an encounter with said context-creating trigger by:
   constructing a continuation block, said continuation block comprising a block header and a stack fragment, said stack fragment comprising a range of said stack memory between a current stack top address and a current stack base address; and
   pushing said continuation block onto said memory;
  a logic to encounter an evaluation instruction; and
  a logic for responding to an encounter with said evaluation instruction by:
   popping said continuation block from said stack memory;
   pushing a stack fragment portion of said continuation block onto said stack memory;
   setting said current stack top to a start of said stack fragment; and
   setting said current stack base to an end of said stack fragment.

* * * * *